(12) United States Patent
Maeda et al.

(10) Patent No.: US 9,725,323 B2
(45) Date of Patent: Aug. 8, 2017

(54) METHOD FOR PRODUCING GRAPHITE AND PARTICULATES FOR GRAPHITE PRODUCTION

(71) Applicant: JX NIPPON OIL & ENERGY CORPORATION, Tokyo (JP)

(72) Inventors: Takashi Maeda, Tokyo (JP); Kunihiko Satou, Tokyo (JP)

(73) Assignee: JX Nippon Oil & Energy Corporation (JP)

( * ) Notice: Subject to any disclaimer, the term of this patent is extended or adjusted under 35 U.S.C. 154(b) by 0 days.

(21) Appl. No.: 14/781,167

(22) PCT Filed: Mar. 27, 2014

(86) PCT No.: PCT/JP2014/058836
§ 371 (c)(1),
(2) Date: Sep. 29, 2015

(87) PCT Pub. No.: WO2014/157509
PCT Pub. Date: Oct. 2, 2014

(65) Prior Publication Data
US 2016/0280549 A1 Sep. 29, 2016

(30) Foreign Application Priority Data

Mar. 29, 2013 (JP) ................................ 2013-072704

(51) Int. Cl.
*C01B 31/04* (2006.01)
*C10B 57/00* (2006.01)
(Continued)

(52) U.S. Cl.
CPC .............. *C01B 31/04* (2013.01); *C10B 55/00* (2013.01); *C10B 57/005* (2013.01); *C10B 57/045* (2013.01); *C09C 1/46* (2013.01)

(58) Field of Classification Search
CPC . C01B 31/04; C01B 31/0407; C01B 31/0415; C01B 2204/00; C01B 2204/02;
(Continued)

(56) References Cited

U.S. PATENT DOCUMENTS

| | | | | |
|---|---|---|---|---|
| 1,975,259 A | * | 10/1934 | Derby | ..................... C01B 31/00 423/448 |
| 4,209,332 A | * | 6/1980 | Tsujio | ..................... C09D 13/00 106/271 |
| 4,985,184 A | | 1/1991 | Takahashi et al. | |

FOREIGN PATENT DOCUMENTS

| | | |
|---|---|---|
| CN | 101540397 A | 9/2009 |
| CN | 201473319 U | 5/2010 |

(Continued)

OTHER PUBLICATIONS

International Preliminary Report on Patentability, Chapter 1, for Application No. PCT/JP2014/058836 dated Oct. 8, 2015.
(Continued)

*Primary Examiner* — Daniel C McCracken
(74) *Attorney, Agent, or Firm* — Lerner, David, Littenberg, Krumholz & Mentlik, LLP

(57) ABSTRACT

Provided are a method for producing artificial graphite through a vertical graphitization furnace with easy circulation of inert gas, uniform heating and no damage to the furnace; and particulates used therefor. The method comprises steps of: introducing graphitizable particulates having average particle diameter of 3 to 30 mm into an inside of the furnace from upper part thereof, heating the particulates at 2200° C. to 3200° C. while making inert gas flow from lower part toward upper part thereof to graphitize the particulates, and removing the graphite through lower part thereof. The particulates have average particle diameter of 3 to 30 mm and are obtained by granulating mixture comprising 100 wt parts of graphitizable carbonaceous substance powder having average particle diameter of 10 to 20 μm, 3 to 20 wt parts of binder decomposable at lower than 1000° C., and 5 to 30 wt parts of liquid which can dissolve the binder.

4 Claims, 1 Drawing Sheet

(51) Int. Cl.
*C10B 57/04* (2006.01)
*C10B 55/00* (2006.01)
*C09C 1/46* (2006.01)

(58) Field of Classification Search
CPC ............ C01B 2204/04; C01B 2204/06; C01B 2204/065; C01B 2204/20; C01B 2204/22; C01B 2204/24; C01B 2204/28; C01B 2204/30; C01B 2204/32
USPC ...................................................... 423/448
See application file for complete search history.

(56) References Cited

FOREIGN PATENT DOCUMENTS

| | | |
|---|---|---|
| CN | 101798221 A | 8/2010 |
| EP | 0918040 A1 | 5/1999 |
| EP | 1186646 A2 | 3/2002 |
| EP | 1220349 A1 | 7/2002 |
| JP | H11171519 A | 6/1999 |
| JP | H11209114 A | 8/1999 |
| JP | H11322317 A | 11/1999 |
| JP | H11322318 A | 11/1999 |
| JP | 2001089118 A | 4/2001 |
| JP | 2004099438 A | 4/2004 |
| JP | 2005289803 A | 10/2005 |

OTHER PUBLICATIONS

International Search Report for Application No. PCT/JP2014/058836 dated Apr. 28, 2014.
Chinese Office Action and Search Report for Application No. 201480018863.X dated Aug. 29, 2016.
Extended European Search Report for Application No. EP14772787 dated Nov. 7, 2016.
Chinese Office Action for Application No. CN201480018863.X dated Apr. 27, 2017.

\* cited by examiner

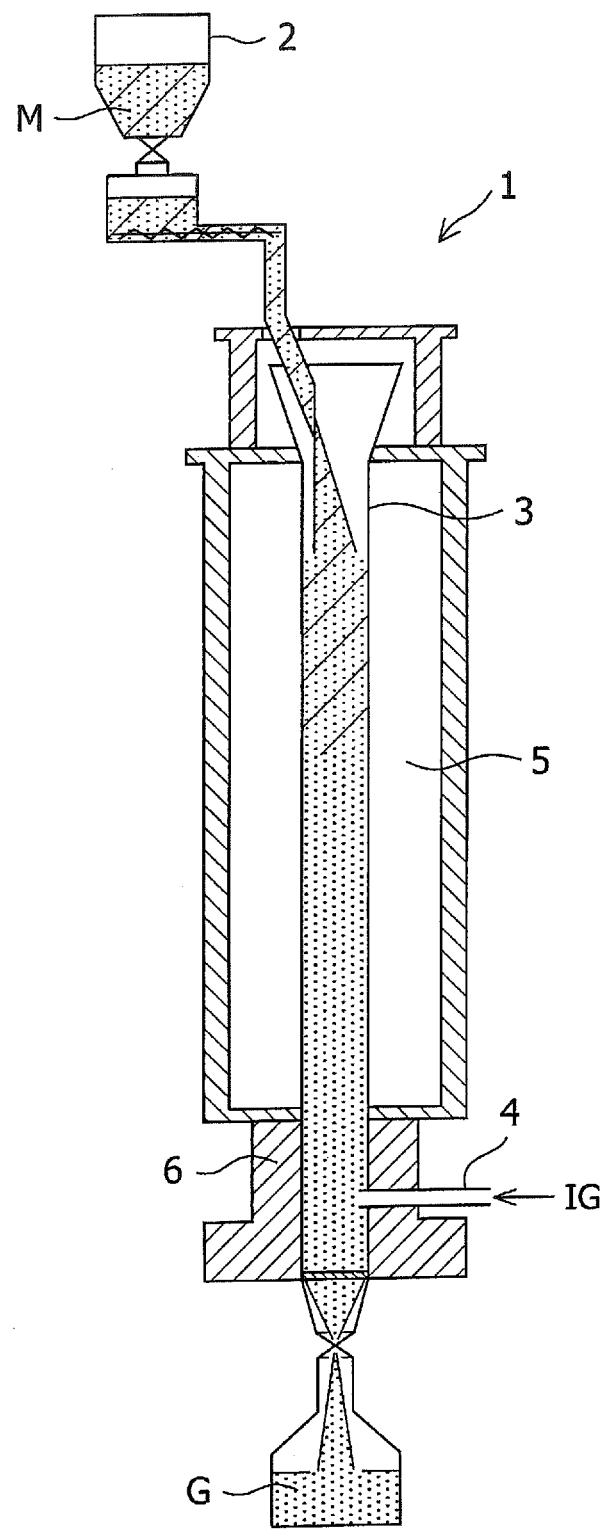

METHOD FOR PRODUCING GRAPHITE AND PARTICULATES FOR GRAPHITE PRODUCTION

CROSS REFERENCE TO RELATED APPLICATIONS

The present application is a national phase entry under 35 U.S.C. §371 of International Application No. PCT/JP2014/058836 filed Mar. 27, 2014, published on Oct. 2, 2014, Publication No. WO2014/157509, which claims priority from JP 2013-072704 filed Mar. 29, 2013, all of which are hereby incorporated herein by reference.

TECHNICAL FIELD

The present invention relates to a method for producing artificial graphite and a particulate material used therefor. More specifically, the present invention relates to a method for producing graphite through a vertical continuous graphitization furnace, the method being efficient and preventing damage of the graphitization furnace; and particulates used therefor.

BACKGROUND ART

Graphite has excellent lubrication, conductivity, thermal resistance, and acid and alkali resistance so that it has far been used in a variety of applications such as paste for electrodes, mold-painting agents, dry cells, pencils, refractories, lagging materials for steel making, rubber resins, solid lubricants, crucible, packing, thermal resistance, thermal-resistant products, conductive paint, pencils, electric brushes, grease, powder metallurgy, brake pads, lining, clutches, mechanical seals, and additives such as rubber resins. Thus, the graphite has an extremely wide application range.

In recent years, there have been cases in which graphite is used as an electrode material for a lithium ion battery, taking advantage of a phenomenon in which Li ions come into the laminated structure part of graphite crystals.

As described above, graphite is used in a variety of fields and it can be said that the establishment of an efficient production method is extremely important.

Generally, when artificial graphite is produced, it is necessary to powder a graphitizable material comprising a carbon substance such as coke and heat the powdered material at about 2200° C. or higher for a long period of time. A material capable of withstanding the heating at 2200° C. or higher is generally graphite and it is common to use a graphitization furnace or a graphite member for the production of artificial graphite.

Industrially, it is common to graphitize raw material in an Atchison furnace for batch processing, but it is also possible to efficiently produce graphite by continuously graphitizing raw material. To continuously graphitize raw material, there is a method in which a furnace is installed in the horizontal direction, and a tray loaded with graphitizable material is moved in the horizontal direction using a conveyor belt and is heated in the graphitization furnace. The necessity of the above-described work at a high temperature requires selection of material for components in the facility, and creates a problem of the countermeasures for exhaust gas or the management of heat at the inlet or the outlet. As a result, there are problems in that the structure becomes complicated and requires the efforts for installation or operation.

A vertical continuous graphitization furnace having the furnace part vertically placed is recently used, graphitizable material is dropped from the upper part of the furnace and heated therein, and graphite is removed through the lower part of the furnace (Patent Document 1). In this method, the material is heated while being accumulated from the lower part toward the upper part of the furnace, and graphite is removed through an opening at the lower part thereof, while an amount of the material corresponding to the removed graphite is introduced from an opening at the upper part thereof, whereby a constant amount of the material is present and graphitized in the furnace at all times.

In this method, since only the inside of the furnace is heated and a tray or a conveyor belt capable of withstanding heating is not required, the structure is relatively simple. In addition, since a facility or power for the movement is not required, an excessive number of wires are not required and thus the operation is also simple.

PRIOR ART DOCUMENT

Patent Document

Patent Document 1: JP 11-209114A

SUMMARY OF THE INVENTION

Problem to be Solved by the Invention

In a vertical continuous graphitization furnace, since material under graphitization comes into contact with the wall surface of the graphitization furnace and causes friction therewith, the wall surface may be damaged depending on the state of the material. In addition, impurities, particularly sulfur compounds, present in the material, are gasified and deteriorate the inside surface of the furnace. Particularly when the material in a powder form is graphitized, there are cases in which circulation paths of inert gas cannot be secured so that the circulation becomes uneven and gas derived from the impurities locally hits the wall surface of the furnace at a high concentration, resulting in significant deterioration on the inside surface of the furnace. Furthermore, in a method in which graphitizable material powder is used, it has become a problem of how to heat the graphitizable material powder uniformly.

According to the present invention, there are provided a method for producing artificial graphite through a vertical graphitization furnace in which the circulation of inert gas becomes easy, uniform heating can be achieved, and the furnace is not damaged; and particulates for use in the method.

Solution to the Problems

In the present invention, there is provided a method for producing graphite, comprising the steps of: introducing graphitizable material particulates having an average particle diameter of 3 to 30 mm into an inside of a vertical graphitization furnace from an upper part thereof, heating the graphitizable material particulates at 2200° C. to 3200° C. while making inert gas flow from a lower part toward an upper part thereof to graphitize the graphitizable material particulates, and removing obtained graphite through a lower part thereof.

In the present invention, there is also provided particulates for use in producing graphite through a vertical graphitization furnace, the particulates having an average particle diameter of 3 to 30 mm and being obtained by granulating a mixture comprising 100 parts by weight of graphitizable carbonaceous substance powder having an average particle diameter of 10 to 20 μm, 3 to 20 parts by weight of a binder decomposable at a temperature of lower than 1000° C., and 5 to 30 parts by weight of a liquid which can dissolve the binder.

Effects of the Invention

When graphitizable material particulates obtained through granulation are used, the circulation of inert gas from a lower part toward an upper part of a vertical graphitization furnace becomes easy, graphitization can become uniform, and gas derived from impurities is uniformly exhausted, whereby the furnace is not damaged.

BRIEF DESCRIPTION OF THE DRAWING

The FIGURE is a sectional view illustrating an example of a vertical graphitization furnace.

MODE FOR CARRYING OUT THE INVENTION

According to the present invention, a graphitizable carbonaceous substance is graphitized through a vertical continuous graphitization furnace. The graphitizable carbonaceous substance alone may be introduced into the vertical continuous graphitization furnace. However, it is preferable to introduce graphitizable material comprising the graphitizable carbonaceous substance and, for example, a binder. In the present specification, "graphitizable material" includes graphitizable material composed of a graphitizable carbonaceous substance alone.

The vertical continuous graphitization furnace is a furnace in which a tubular heating device is installed, the longitudinal direction of the tube becomes perpendicular, and the graphitizable carbonaceous substance naturally dropped from an opening at an upper part of the tube is held in the tube at a constant volume above the bottom part, while being heated for graphitization. More specifically, the vertical graphitization furnace comprises a cylindrical inner tube comprising a graphite inside wall surface, and a heater on or over the outside of the inner tube, wherein the heater is used for graphitization.

A typical example of the heater is a heater with an electrically-heated wire. A heater with a high frequency may be also used. The outside of the electrically-heated wire is optionally insulated with adiabatic material or the like. In order to facilitate graphitization, the graphitizable material is heated, for example, at 2200° C. to 3200° C., typically at 2400° C. to 3000° C. with the heater.

The inside of the tube is preferably divided into a heating zone and a cooling zone from the upper part toward the bottom of the tube, and the graphitizable material is introduced to the upper part of the heating zone of the tube. An optional preliminary heating zone may be provided on or above the heating zone. The graphitizable material is typically introduced through a hopper or the like installed at an opening at the upper part of the tube.

The heating zone means a zone in which the graphitizable material is heated to, for example, 2200° C. to 3200° C. to obtain graphite, while the cooling zone means a zone in which the obtained graphite is cooled to, for example, 30° C. to 200° C. The length ratio of the heating zone to the cooling zone is preferably 1:(0.2 to 0.5).

The introduced graphitizable material is graphitized in the heating zone and reaches the cooling zone. At this time, the later-introduced graphitizable material is accumulated on the earlier-introduced graphitizable material, is held in the tube, and moves into the heating zone for graphitization. At this time, for the sake of safety, inert gas such as nitrogen, argon or helium is allowed to flow into the tube from the bottom part toward an upper part of the furnace. The flow rate of the inert gas is, for example, in a range of 2 to 40 L/minute, preferably in a range of 4 to 30 L/minute.

The obtained graphite is removed through the bottom part of the furnace. Regarding the removal, the graphite may be removed continuously without any break or may be removed intermittently every certain amount.

The FIGURE illustrates an example of the vertical graphitization furnace. In a vertical graphitization furnace 1, graphitizable material M is introduced into an upper part of a tube 3 from a hopper 2, is heated and graphitized in a heating zone 5 while inert gas IG is allowed to flow from the lower part toward the upper part starting through an inert gas introduction tube 4, and is cooled in a cooling zone 6. The obtained graphite 7 is removed from the bottom part.

The graphitizable carbonaceous substance is a substance mainly containing hydrocarbon and is thermally graphitized. Specific examples thereof include petroleum coke, coal coke and pitch. The graphitizable carbonaceous substance is preferably petroleum coke which is obtained through the delayed coking of raw material oil which is obtained from reduced-pressure distillate oil during a crude oil treatment or obtained from bottom oil in a residue fluid catalytic cracker (RFCC), wherein the raw material oil is particularly preferably a mixture of a heavy oil having an initial boiling point of 300° C. or higher, total content of an asphaltene component and a resin component of 25% by weight or less, and content of a saturated component of 40% by weight or more, and a heavy oil having an aromatic index fa of 0.3 or more and an initial boiling point of 150° C. or higher. These substances are capable of producing scale-like graphite powder. These substances are preferred since hard powder is formed after graphitization.

The reduced-pressure distillate oil is a distillate oil from a reduced-pressure distillation apparatus obtained by subjecting crude oil to an atmospheric distillation apparatus to obtain gas, a light oil and an atmospheric residue and then subjecting the atmospheric residue to heating at furnace outlet temperature in a range of 320° C. to 360° C. under a reduced pressure of 10 to 30 Torr.

The residue fluid catalytic cracker (RFCC) is an apparatus for carrying out fluidized bed-type fluid catalytic cracking in which residual oil such as an atmospheric residue is used as raw material oil and a cracking reaction is selectively carried out in the presence of a catalyst, thereby obtaining FCC gasoline having a high octane value. Examples of the bottom oil in the residue fluid catalytic cracker include bottom oil produced by subjecting residue oil such as atmospheric residue to a reactor reaction temperature (ROT) in a range of 510° C. to 540° C. with a weight ratio of catalyst to oil of 6 to 8. Here, regarding the operation conditions of the residue fluid catalytic cracker (RFCC), the bottom oil can be obtained by, for example, subjecting an atmospheric residue having a density of 0.9293 g/cm$^3$ and 5.5% by weight of residual carbon to fluid catalytic cracking at a reaction temperature of 530° C. under a total pressure of 0.21 MPa with a ratio of catalyst to oil of 6.

The initial boiling point refers to a temperature (° C.) read on a thermometer when the first droplet of distillate drops from the bottom end of a condensation tube in accordance with JIS K 2254.

The contents of the saturated component, the resin component, and the asphaltene component can be measured using the TLC-FID method. The TLC-FID method refers to a method in which a sample is separated into four components of a saturated component, an aromatic component, a resin component and an asphaltene component through thin layer chromatography (TLC), and then each component is detected using a flame ionization detector (FID), and each component content (percentage) is obtained from the ratio of the amount of each component to the total amount of all the components.

First, 0.2 g±0.01 g of a sample is dissolved in 10 ml of toluene to obtain a sample solution. A spot of 1 μl of the solution is formed on the lower end (at a position 0.5 cm apart from the rod holder) of a pre-baked silica gel rod-shaped thin layer (Chroma Rod) using a micro-syringe and is dried using a dryer or the like. Next, 10 micro rods are grouped as a single set and the sample is developed using developing solvents. As the developing solvents, hexane, hexane/toluene (volume ratio of 20:80), and dichloromethane/methanol (volume ratio of 95:5) are respectively used in the first developing chamber, the second developing chamber and the third developing chamber. The saturated component is eluted and developed in the first developing chamber using hexane as a solvent. The aromatic component is eluted and developed in the second developing chamber after the first development. The asphaltene component is eluted and developed in the third developing chamber using dichloromethane/methanol as a solvent after the first development and the second development. The developed Chroma Rods are set in a measurement instrument such as "IATROSCAN MK-5" (product name, manufactured by Dia-Iatron Co., Ltd. (currently Mitsubishi Kagaku Iatron, Inc.)) and the amount of each component is measured using a flame ionization detector (FID). When the amount of each component is summed together, the total amount of all the components can be obtained.

The aromatic index fa can be obtained using the Knight method. In the Knight method, the carbon distribution is divided into three components ($A_1$, $A_2$ and $A_3$) as the spectrum of aromatic carbon using the $^{13}$C-NMR method. Here, $A_1$ represents the carbon atom number inside the aromatic ring, the substituted aromatic carbon atom number and a half of unsubstituted aromatic carbon atom number (corresponding to the peak of approximately 40 to 60 ppm of $^{13}$C-NMR), $A_2$ represents the other half of unsubstituted aromatic carbon atom number (corresponding to the peak of approximately 60 to 80 ppm of $^{13}$C-NMR), $A_3$ represents the aliphatic carbon atom number (corresponding to the peak of approximately 130 to 190 ppm of $^{13}$C-NMR), and fa can be obtained from the following equation:

$$fa=(A_1+A_2)/(A_1+A_2+A_3).$$

The fact that the $^{13}$C-NMR method is the best method for quantitatively obtaining fa, which is the most fundamental amount of the chemical structure parameters of pitches, is described in a journal article ("Characterization of Pitches II. Chemical Structures" by Yokono and Osada (Carbon, 1981 (No. 105), pp 73 to 81).

The delayed coking method is a method for obtaining raw coke by thermally treating a heavy oil with a delayed coker under a pressurization condition. As the conditions of the delayed coker, a pressure in a range of 0.5 MPa to 0.7 MPa and a temperature in a range of 500° C. to 530° C. are preferred. Since raw coke for this delayed coker process contains a large amount of moisture, the raw coke is subjected to drying, followed by grinding and classification.

The graphitizable carbonaceous substance is optionally powdered before being introduced into a graphitization furnace.

The average particle diameter of the powder of the graphitizable carbonaceous substance is preferably in a range of 10 to 20 μm. The average particle diameter can be measured using the laser diffraction and scatting method. The powdering method can be arbitrarily selected. When petroleum coke is used, it is preferable to subject the petroleum coke to, for example, a vibration sieve to obtain the petroleum coke having a diameter of approximately 1 to 5 mm and then to drying. Generally, the petroleum coke contains a volatile oil component and moisture during recovery. Therefore, drying is required. The petroleum coke may be dried until the content of moisture drops to, preferably, 1% by weight or less. The volatile oil component may be optionally removed by heating the petroleum coke preferably at approximately 600° C. for one hour to two hours.

Subsequently, the petroleum coke is powdered with a jet mill, a ball mill, a hammer mill or the like.

When the graphitizable material is petroleum coke, coal coke or the like, the graphitizable material may be graphitized as it is, but it is preferable to calcine the graphitizable material one time preferably at approximately 900° C. to 1500° C. in order to improve the subsequent treatments or the properties of graphite powder to be obtained later. Generally, the calcination is carried out using a rotary kiln.

According to the present invention, the powder of the obtained graphitizable carbonaceous substance is granulated. Through the granulation, particulates having an average particle diameter of 3 to 30 mm are obtained. The particulate may have any shape such as a spherical shape, an elliptical shape or a barrel shape. In general, it is preferable to process the particulate into a so-called resin pellet shape such as a barrel shape or a cylindrical shape. The average particle diameter is measured using the screening method with a punching metal sieve described in JIS Z 8801-2.

When the average particle diameter of the particulates is smaller than 3 mm, the flow of gas becomes poor in the graphitization furnace. When the average particle diameter is more than 30 mm, it is difficult to produce the particulates, and the operability or the degree of the progress of graphitization varies depending on places, or the particulates are likely to break.

The method for powdering the graphitizable carbonaceous substance first and then granulating the graphitizable carbonaceous substance can be arbitrarily selected as long as the graphitizable carbonaceous substance is not broken at least when it is introduced into the graphitization furnace, while it can be easily crushed when the graphitization ends.

There are various kinds of granulation methods and examples thereof include a tumbling-type granulation method, a fluid bed-type granulation method, an extrusion-type granulation method, a compression-type granulation method and a crushing-type granulation method, which are classified depending on the fundamental characteristics thereof. The extrusion-type granulation method is particularly preferred. The extrusion-type granulation method refers to a method in which a plastic material is extruded from a die using a screw-, piston- or roll-type extruder to obtain a cylindrical granulated product.

To produce such particulates, it is preferable to granulate the graphitizable material containing a binder mixed therein. The binder stabilizes the shapes of particulates produced from the powder of the graphitizable carbonaceous substance. Graphite is used in a powder form at the end and the remaining component other than graphite causes a disadvantage so that the binder is preferably decomposed in the graphitization furnace.

The binder is preferably a binder evaporable or evaporable through decomposition at a temperature of preferably lower than 1000° C., more preferably 150° C. or higher but lower than 1000° C., still more preferably from 200° C. to 500° C. That is, it is preferable to allow the binder to be present in the particulates to be introduced into the graphitization furnace, and to allow the binder to be absent in the graphite removed from the graphitization furnace. Specific examples of the binder include water-soluble polymers such as polyvinyl alcohols and celluloses; and acrylic polymers.

The amount of the binder to be used is preferably in a range of 3 to 20 parts by weight relative to 100 parts by weight of the graphitizable carbonaceous substance. When the binder is more than 20 parts by weights, carbon derived from the binder may remain and affect products in which the graphite is used, which is not preferable.

The binder is preferably dissolved or dispersed in a solvent or a dispersant before being used.

Examples of the solvent or dispersant for the binder may include water, ethanol, polyoxyethylene, polyoxypropylene, alkyl ether, or a mixture thereof. When a water-soluble polymer is used as the binder, it is preferable to use the water-soluble polymer dissolved in water. When the water-soluble polymer is used, it takes time to disperse the water-soluble polymer uniformly in the dispersant because of swelling through moisture absorption by the water-soluble polymer, so that it is preferable to disperse the water-soluble polymer in the dispersant in advance before introduction into a granulator (for example, a kneader).

The solvent or the dispersant is preferably used in an amount of from 5 to 30 parts by weight relative to 100 parts by weight of the graphitizable carbonaceous substance. When the amount of the binder, the solvent or the dispersant is small, it may become difficult to granulate the graphitizable carbonaceous substance. When the amount of the binder, the solvent or the dispersant is too large, voids may be generated inside particulates so that the particulates may become weak. Thus, there may be a problem of the particulates breaking into power in the lower part of the furnace. When the graphitizable carbonaceous substance is powdered, the flow of the inert gas from the lower part of the furnace is hindered owing to the resistance of powder so that sulfur contained in coke reacts with the carbon which is a furnace material, to damage the wall surface of the graphitization furnace.

The method for mixing the graphitizable carbonaceous substance with the binder can be arbitrarily selected. In general, the powdered graphitizable carbonaceous substance is introduced into a kneader together with a solution or dispersion of the binder in a solvent or dispersant, and stirred, mixed and kneaded to uniformly disperse the graphitizable carbonaceous substance powder in the liquid. As a result, a kneaded product is obtained. It is preferably to introduce a mixture of the graphitizable carbonaceous substance and the solution or dispersion of the binder in a solvent or dispersant into a kneader.

An example of the kneader includes an apparatus which imparts a distributed flow movement to the liquid and the graphitizable carbonaceous substance powder by rotating stirring blades so as to uniformly knead the graphitizable carbonaceous substance powder in the liquid. Such an example of the kneader includes a rotor kneader.

During kneading, a surfactant is preferably added to the dispersant. The surfactant can provide an effect of dispersing the graphitizable carbonaceous substance powder more uniformly, or an effect of dispersing the graphitizable carbonaceous substance powder uniformly in a shorter period of time. The surfactant is preferably added in an amount of 0 to 5 parts by weight relative to 100 parts by weight of the graphitizable carbonaceous substance.

Preferable examples of the surfactant include a nonionic or amphoteric surfactant such as EMULGEN or AMPHITOL (product name).

A plasticizer, a water-soluble wax, a water-dispersible wax or the like may be optionally used to facilitate the granulation of the graphitizable carbonaceous substance.

Examples of the plasticizer include glycols such as glycerin, diglycerin, ethylene glycol and triethylene glycol; sorbitol; ethanolamines; ethanol acetamide; and urea.

Preferable examples of the water-soluble or water-dispersible wax include polyethylene glycol having an average molecular weight of 1000 or more, and stearic acid or a salt thereof.

The plasticizer, and the water-soluble or water-dispersible wax are preferably in an amount of 0 to 5 parts by weight, respectively, relative to 100 parts by weight of the graphitizable carbonaceous substance.

The obtained kneaded product is extruded in an extrusion step for pelletization.

For example, a front extrusion-type screw granulator is used as an extruder, in which the kneaded product is pressurized and compressed using the thrust force of the screw, and is extruded through a die attached to the front end part. It is the most common procedure. At this time, it is necessary to carry out extrusion at a temperature which can avoid evaporating the solvent to form air bubbles.

The diameter of the die is preferably in a range of approximately 3 to 30 mm. Since it is necessary to dry the extruded particulates after the extrusion and the particulates contract in the drying step, a die having an appropriately large diameter may be used.

When the kneaded product is extruded into a long string shape, the kneaded product is cut into pieces, each having an appropriate length. The kneaded product can be cut into an appropriate length by, for example, providing a rotating cutter or the like on or over the front surface of the die and rotating the cutter at an appropriate rotation speed. Cylindrical particles having a height of the cut length are generated so that when the aspect ratio, which is the ratio (diameter/length) of the diameter to length (height) of a cross-section, is from 1.0 to 1.3, the die diameter approximates to the average particle diameter obtained by a sieving method as the volume equivalent diameter.

The extruded particulates are dried.

During drying, the dispersant is removed by blowing hot air thereto. At this time, the particulates are preferably dried at 80° C. to 150° C. for approximately 1 hour to 12 hours and it is necessary to avoid the breakage of the particulates. If necessary, drying may be accelerated by drying under a reduced pressure or a vacuum.

The particulates of the graphitizable material obtained as described above are introduced into the above-mentioned vertical continuous graphitization furnace and are heated.

As the heating method, any heating method may be selected as long as an intended product can be produced. It is common to accumulate the graphitizable material in the graphitization furnace, begin the heating after a certain amount of the graphitizable material is accumulated, and introduce the graphitizable material from the upper part while removing and collecting the graphite from the lower part after heat reaches a steady state. The amount of the graphitizable material introduced varies depending on the size of the graphitization furnace. The amount thereof is preferably selected so that heating in a sintering unit is carried out at a maximum temperature of 2200° C. to 3000° C. for 1 hour to 10 hours.

In the graphitizable carbonaceous substance, crystals gradually grow in accordance with the thermal history. The size to which the crystals grow varies depending on a type of the graphitizable material used. Thus, it is necessary to limit the temperature and time for the maximum heating, depending on the type of the graphitizable material used.

Since the binder contained by the graphitizable material particulates is fully decomposed owing to heating of the graphitizable material, only graphite is present in the graphite aggregate removed from the vertical continuous graphitization furnace. The obtained graphite aggregate is crushed so as to return to a powder form. Examples of the crusher include a rotor mill and a jet mill.

The collected graphite can be used for a variety of applications.

EXAMPLES

Hereinafter, the present invention will be described on basis of Examples and Comparative Examples. It should not be construed that the present invention is limited to or by Examples.

Examples 1 to 5 and Comparative Examples 1 to 3

(1) Preparation of Graphitizable Carbonaceous Substances

Graphitizable carbonaceous substances used are described below.

<Raw Coke 1> (Used in Example 1 and Comparative Examples 1-3)

A mixture of a heavy oil having an initial boiling point of 332° C., the content of asphaltene and resin components of 23% by weight and the content of a saturated component of 47% by weight, and a heavy oil having an aromatic index of 0.4 or more and an initial boiling point of 160° C., was subjected to delayed coking at an average temperature of 450° C. to obtain raw coke. The raw coke was sieved with a vibration sieve to obtain the particles of 3 mm or less. They were dried in a circulating hot air furnace at 150° C. to 200° C. so that the moisture content reached 1% by weight or less, and then powdered with a rotor mill to obtain powdery Raw Coke 1 having an average particle diameter of 12 μm.

<Raw Coke 2> (Used in Example 2)

A mixture of a heavy oil having an initial boiling point of 335° C., the content of asphaltene and resin components of 27% by weight and the content of a saturated component of 43% by weight, and a heavy oil having an aromatic index of 0.4 or more and an initial boiling point of 168° C., was subjected to delayed coking at an average temperature of 450° C. to obtain raw coke. The raw coke was sieved with a vibration sieve to obtain the particles of 3 mm or less. They were dried in a circulating hot air furnace at 150° C. to 200° C. so that the moisture content reached 1% by weight or less, and then powdered with a rotor mill to obtain powdery Raw Coke 2 having an average particle diameter of 12 μm.

<Raw Coke 3> (Used in Example 3 and Comparative Example 2)

Commercially available raw coke was sieved with a vibration sieve to obtain particles of 3 mm or less. They were dried in a circulating hot air furnace at 150° C. to 200° C. so that the moisture content reached 1% by weight or less, and then powdered with a rotor mill to obtain powdery Raw Coke 3 having an average particle diameter of 12 μm.

<Calcined Coke 1> (Used in Example 4)

Raw Coke 1 was calcined at approximately 1500° C. using a rotary kiln to obtain calcined coke. The calcined coke was sieved with a vibration sieve or the like to obtain the particles of 3 mm or less. Then, they were powdered with a rotor mill to obtain powdery Calcined Coke 1 having an average particle diameter of 12 μm.

<Calcined Coke 2> (Used in Example 5)

Raw Coke 2 was calcined at approximately 1500° C. using a rotary kiln to obtain calcined coke. The calcined coke was sieved with a vibration sieve or the like to obtain the particles of 3 mm or less. Then, they were powdered with a rotor mill to obtain powdery Calcined Coke 2 having an average particle diameter of 12 μm.

(2) Pelletization

An aqueous binder solution was prepared by dissolving a binder (PVA) and a water-soluble wax (polyethylene glycol) in a solvent (water). The aqueous binder solution was added to the above-described powdery coke in a cement mixer (a ribbon mixer or the like) in such an amount that the binder was of 1 to 20 parts by weight relative to 100 parts by weight of the powdery coke, and then an appropriate amount of water was added thereto. The resulting mixture was mixed for 30 minutes to obtain a low-humidity powder or a slurry.

Subsequently, the low-humidity powder or the slurry of coke powder was heated and mixed with stirring at 50° C. to 150° C. using a kneader or the like, and subjected to an extruder with a die having a 5 to 20 mmϕ hole to obtain cut pellets having an extruded length of approximately 5 to 30 mm, which was the same as the size of the die.

Subsequently, the pellets were dried at approximately 100° C. to 150° C. for 2 hours to 10 hours for removal of moisture. The hole diameter of the die was used as the particle diameter of the cross-section of the pellet. The pellet had the cross-section in a tubular shape having the cut length as a height. Thus, the cut length was selected to be such a length that the aspect ratio, which was the ratio of the diameter of the cross-section to the length (diameter/length), reached 1.0 to 1.3.

The composition of each graphitizable material pellet and the average particle diameter of the pellets are shown in Table 1. In Comparative Examples 1 and 2, palletization was not carried out and powdery Raw Cokes 1 and 3 were respectively graphitized. In Comparative Example 3, pellets of Raw Coke 1 having an average particle diameter of 35 mmϕ were used.

TABLE 1

| | Graphitizable material | | | | | | | |
|---|---|---|---|---|---|---|---|---|
| | Graphitizable carbonaceous substance powder: coke | | Additives | | | | | Graphitizable material pellets |
| | average | | Binder | | Water-soluble wax | | Water | |
| | particle diameter (μm) | amount (parts by weight) | type | amount (parts by weight) | type | amount (parts by weight) | amount (parts by weight) | average particle diameter (mm) |
| Example 1 | 12 | 100 | PVA | 5 | PEG | 2 | 20 | 10 |
| Example 2 | 12 | 100 | PVA | 7 | PEG | 2 | 20 | 20 |
| Example 3 | 12 | 100 | PVA | 5 | PEG | 2 | 20 | 5 |
| Example 4 | 12 | 100 | PVA | 5 | PEG | 2 | 20 | 10 |

TABLE 1-continued

| | Graphitizable material | | | | | | | |
|---|---|---|---|---|---|---|---|---|
| | Graphitizable carbonaceous substance powder: coke | | Additives | | | | | Graphitizable material pellets |
| | average | | Binder | | Water-soluble wax | | Water | |
| | particle diameter (μm) | amount (parts by weight) | type | amount (parts by weight) | type | amount (parts by weight) | amount (parts by weight) | average particle diameter (mm) |
| Example 5 | 12 | 100 | PVA | 7 | PEG | 2 | 20 | 20 |
| Comp. Ex. 1 | 12 | 100 | — | — | — | — | — | not pelletized |
| Comp. Ex. 2 | 12 | 100 | — | — | — | — | — | not pelletized |
| Comp. Ex. 3 | 12 | 100 | PVA | 25 | PEG | 3 | 30 | 35 |

\* PVA represents polyvinyl alcohol and PEG represents polyethylene glycol.

(3) Graphitization

Graphitization was carried out using a cylindrical upright graphitization furnace containing a heating part having a height of 5 meters and a diameter of 20 cm. Approximately 20 L/min of nitrogen gas was introduced from the lower part of the graphitization furnace, the samples in pellet form were loaded up to a height of approximately four fifths of the graphitization furnace except for Comparative Examples 1-2, and a reaction was carried out. In Comparative Examples 1-2, powdery Raw Cokes 1 and 3, which were not pelletized, were used, respectively. The sintering was carried out in three zones (1100 mm-length×3) in the heating part of the furnace, and the three zones contain, in order from a higher position to a lower position, the first and second zones of high-temperature parts (or sintering parts) of 2500° C. to 2600° C. and the third zone (of an annealing part or a first cooling part) of 1900° C. to 2100° C.

Furthermore, the 1 m-long part near the bottom is a cooling part with a water cooling jacket, where graphite was sufficiently cooled. The cooled graphite was discharged into a bottom hopper. The substantial graphitization time was set to 7 hours to 10 hours.

The reaction temperature was set so that the maximum temperature of the samples reached 2500° C. to 2600° C.

(4) Crushing of Graphite Aggregate

The graphite aggregate was crushed with a ball mill to return the graphite into a powder form.

(5) Evaluation of Graphite and Inside of Graphitization Furnace

The appearance of the graphite powder was observed and sulfur content thereof was measured with a fluorescent X-ray analyzer. In addition, the inside of the graphitization furnace was observed.

The graphite powders obtained in Examples 1-2 and 4-5 had uniform particle diameters, and the sulfur contents of the graphite powders were measured and found to be 1.3 ppm or less. In Examples 1-2 and 4-5, the concentration of carbon disulfide in the exhaust gas from the furnace was 50 ppm, and no problem was found though the investigation of the inside of the graphitization furnace.

The graphite powder obtained in Example 3 had a non-uniform distribution of particle diameters, but there was no problem in use as graphite, and the sulfur content of the graphite powder was measured and found to be 2.0 ppm. In Example 3, the concentration of carbon disulfide in the exhaust gas from the furnace was 90 ppm, and no problem was found through the investigation of the inside of the graphitization furnace.

Regarding the graphite powders obtained in Comparative Examples 1-2, the sulfur contents thereof were measured and found to be 3.0 ppm. In Comparative Examples 1-2, the concentration of carbon disulfide in the exhaust gas from the furnace was 4600 ppm, and it was found through the investigation of the inside of the graphitization furnace that the first zone was eroded.

In Comparative Example 3, it was necessary to increase the amount of the binder to maintain the shape. When graphitization was carried out using the same furnace under the same conditions as in Example 1, graphite particles having their central parts not sufficiently graphitized were present. When graphitization was carried out using the same furnace under the conditions allowing the graphitizable material to stay in the furnace twice as long as in Example 1, there were a number of particles having the different degrees of graphitization between their peripheral parts and their central parts. In either case, a number of particles broke during the graphitization.

As indicated by the above-described results, when the graphitizable material in a powder or powder-like form was graphitized, the wall surface (made of graphite) in the graphitization furnace was eroded. When the graphitizable material was in a powder form, it was presumed that the above phenomenon occurred since the flow of the inert gas (nitrogen) from the lower part of the furnace had an extremely small flow rate or was blocked owing to the resistance of the powder and thus sulfur contained by the coke reacted with the carbon which was a furnace material. In addition, when the graphitizable material was in a powder form, it was found that it became difficult to remove the sulfur component derived from petroleum. This was presumed that it was caused by the presence of parts at which the gas did not flow owing to flow difficulty or uneven flow of the gas in the furnace. It is necessary to granulate the graphitizable material to make gas flow as uniformly as possible. However, a particulate in a certain size or larger results in the undesirable difference between the degrees of graphitization in the inside and the outside of the particulate.

In addition, depending on the amount of the binder, the solvent or the dispersant, particulates break during graphitization and return to a powder form, thereby lowering the effect of granulation.

INDUSTRIAL APPLICABILITY

The present invention relates to art for producing artificial graphite using graphitizable material.

EXPLANATION OF SYMBOLS

1 Vertical graphitization furnace
2 Hopper

3 Tube
4 Inert gas introduction tube
5 Heating zone
6 Cooling zone
M Graphitizable material
G Graphite
IG Inert gas

The invention claimed is:

1. A method for producing graphite, comprising the steps of:
    introducing graphitizable material particulates having an average particle diameter of 3 to 30 mm into an inside of a vertical graphitization furnace from an upper part thereof,
    heating the graphitizable material particulates at 2200° C. to 3200° C. while making inert gas flow from a lower part toward an upper part thereof to graphitize the graphitizable material particulates, and
    removing obtained graphite through a lower part thereof, wherein the graphitizable material particulates are obtained by granulating a mixture comprising 100 parts by weight of graphitizable carbonaceous substance powder having an average particle diameter of 10 to 20 μm, 3 to 20 parts by weight of a binder evaporable or evaporable through decomposition at a temperature of lower than 1000° C., and 5 to 30 parts by weight of a solvent or a dispersant which can dissolve or disperse the binder.

2. The method for producing graphite according to claim 1, wherein the binder is a water-soluble polymer and the solvent is water.

3. The method for producing graphite according to claim 1, further comprising a step of crushing the graphite removed through the lower part of the vertical graphitization furnace to obtain a graphite powder.

4. Particulates for use in producing graphite through a vertical graphitization furnace, the particulates having an average particle diameter of 3 to 30 mm and being obtained by granulating a mixture comprising 100 parts by weight of graphitizable carbonaceous substance powder having an average particle diameter of 10 to 20 μm, 3 to 20 parts by weight of a binder evaporable or evaporable through decomposition at a temperature of lower than 1000° C., and 5 to 30 parts by weight of a solvent or a dispersant which can dissolve or disperse the binder.

* * * * *